(12) United States Patent
Harada et al.

(10) Patent No.: US 11,052,466 B2
(45) Date of Patent: Jul. 6, 2021

(54) CUTTING TOOL AND MANUFACTURING METHOD THEREOF

(71) Applicant: SUMITOMO ELECTRIC HARDMETAL CORP., Itami (JP)

(72) Inventors: Gaku Harada, Itami (JP); Yoshinori Tanigawa, Itami (JP); Satoru Kukino, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 0 days.

(21) Appl. No.: 15/763,911

(22) PCT Filed: Aug. 24, 2017

(86) PCT No.: PCT/JP2017/030321
§ 371 (c)(1),
(2) Date: Mar. 28, 2018

(87) PCT Pub. No.: WO2018/123133
PCT Pub. Date: Jul. 5, 2018

(65) Prior Publication Data
US 2019/0054544 A1    Feb. 21, 2019

(30) Foreign Application Priority Data

Dec. 26, 2016  (JP) .............................. JP2016-251645

(51) Int. Cl.
*B23B 27/14*    (2006.01)
*B23B 27/20*    (2006.01)
(Continued)

(52) U.S. Cl.
CPC .............. *B23B 27/20* (2013.01); *B23B 27/14* (2013.01); *B23B 27/145* (2013.01); *B23C 5/10* (2013.01);
(Continued)

(58) Field of Classification Search
CPC .. B23C 5/10; B23C 5/16; B23C 5/207; B23C 5/02; B23B 27/20; B23B 27/14;
(Continued)

(56) References Cited

U.S. PATENT DOCUMENTS 3,815,192 A * 6/1974 Ohtsu ................... B23B 27/143
407/114
5,771,763 A * 6/1998 Naslund ................ B23B 27/145
407/113
(Continued)

FOREIGN PATENT DOCUMENTS

CN        1310069 A    8/2001
CN      104209559 A   12/2014
(Continued)

OTHER PUBLICATIONS

Notification of Reason for Refusal issued in counterpart Korean Patent Application No. 10-2018-7011423, dated Aug. 20, 2019.

*Primary Examiner* — Sara Addisu
(74) *Attorney, Agent, or Firm* — Baker Botts L.L.P.; Michael A. Sartori

(57) ABSTRACT

A cutting tool according to an aspect of the present disclosure includes a cutting edge portion which contains at least one of cubic boron nitride and polycrystalline diamond. The cutting edge portion includes a rake face, a flank face, and a cutting edge. The flank face is contiguous to the rake face. The cutting edge is provided as a ridge line between the rake face and the flank face. The radius of curvature of the cutting edge is 2 µm or more and 8 µm or less.

8 Claims, 4 Drawing Sheets

(51) Int. Cl.
*B23C 5/20* (2006.01)
*B23P 15/34* (2006.01)
*B23C 5/10* (2006.01)
*B23C 5/16* (2006.01)
*B23C 5/02* (2006.01)

(52) U.S. Cl.
CPC ............... *B23C 5/16* (2013.01); *B23C 5/207* (2013.01); *B23P 15/34* (2013.01); *B23C 5/02* (2013.01)

(58) Field of Classification Search
CPC ............ B23B 27/145; B23B 2226/125; B23B 2200/201; B23B 2200/245; B23B 2200/283; B23P 15/34; Y10T 407/26; Y10T 407/27
See application file for complete search history.

(56) References Cited

U.S. PATENT DOCUMENTS

| | | | | |
|---|---|---|---|---|
| 6,612,786 | B1* | 9/2003 | Kanada | B23B 27/145 407/118 |
| 8,057,854 | B2* | 11/2011 | Ahn | B23B 27/141 407/119 |
| 8,691,366 | B2* | 4/2014 | Waki | C23C 14/0021 407/11 |
| 2002/0127068 | A1* | 9/2002 | Kinukawa | B23B 27/145 407/113 |
| 2006/0045637 | A1* | 3/2006 | Flynn | B23C 5/10 407/53 |
| 2006/0188347 | A1* | 8/2006 | Kratz | B23B 27/145 407/113 |
| 2006/0228179 | A1* | 10/2006 | Alm | B23B 27/145 407/113 |
| 2007/0253787 | A1* | 11/2007 | Ishii | B23B 27/141 407/113 |
| 2010/0260559 | A1* | 10/2010 | Higasayama | B23C 5/1036 407/54 |
| 2011/0014426 | A1 | 1/2011 | Ohtomo | |
| 2012/0051854 | A1* | 3/2012 | Pretorius | B23B 27/04 407/100 |
| 2014/0003873 | A1* | 1/2014 | Han | B23C 5/10 407/54 |
| 2015/0125226 | A1 | 5/2015 | Yano et al. | |
| 2016/0040283 | A1 | 2/2016 | Ogami et al. | |
| 2016/0297010 | A1* | 10/2016 | Kukino | B24B 3/34 |
| 2017/0304909 | A1* | 10/2017 | Fukata | B23C 5/10 |
| 2017/0304910 | A1* | 10/2017 | Suehara | B23C 5/10 |
| 2018/0079016 | A1* | 3/2018 | Azegami | B23C 5/10 |
| 2019/0105718 | A1* | 4/2019 | Shapir | B23C 5/26 |

FOREIGN PATENT DOCUMENTS

| | | |
|---|---|---|
| CN | 105008074 A | 10/2015 |
| JP | 2000-190108 A | 7/2000 |
| JP | 2001-212703 A | 8/2001 |
| JP | 2001-300813 A | 10/2001 |
| JP | 2004-122263 A | 4/2004 |
| JP | 2013-508168 A | 3/2013 |
| JP | 2015-030073 A | 2/2015 |
| KR | 10-2001-0082729 A | 8/2001 |
| KR | 10-2015-0023239 A | 3/2015 |
| WO | 2009/116610 A1 | 9/2009 |
| WO | 2011/050053 A2 | 4/2011 |

* cited by examiner

CUTTING TOOL AND MANUFACTURING METHOD THEREOF

TECHNICAL FIELD

The present disclosure relates to a cutting tool and a manufacturing method thereof. The present application claims the priority benefit of Japanese Patent Application No. 2016-251645 filed on Dec. 26, 2016, the contents of which are incorporated herein by reference in its entirety.

BACKGROUND ART

WO 2009/116610 (PTD 1) describes a cutting tool including a cutting edge portion which contains cubic boron nitride. The cutting edge portion of the cutting tool described in PTD 1 includes a rake face, a flank face and a cutting edge. The flank face is contiguous to the rake face.

The cutting edge is provided as a ridgeline between the rake face and the flank face. The cutting edge has a chamfer honed face and a round honed face. The chamfer honed face is located on the rake face side. The round honed face is located on the flank face side. The radius of curvature of the round honed face is not less than 10 μm and not more than 50 μm.

CITATION LIST

Patent Document

PTD 1: WO 2009/116610

SUMMARY OF THE PRESENT DISCLOSURE

A cutting tool according to an aspect of the present disclosure includes a cutting edge portion which contains at least one of cubic boron nitride and polycrystalline diamond. The cutting edge portion includes a rake face, a flank face, and a cutting edge. The flank face is contiguous to the rake face. The cutting edge is provided as a ridgeline between the rake face and the flank face. The radius of curvature of the cutting edge is 2 μm or more and 8 μm or less.

DETAILED DESCRIPTION

Figure 1:
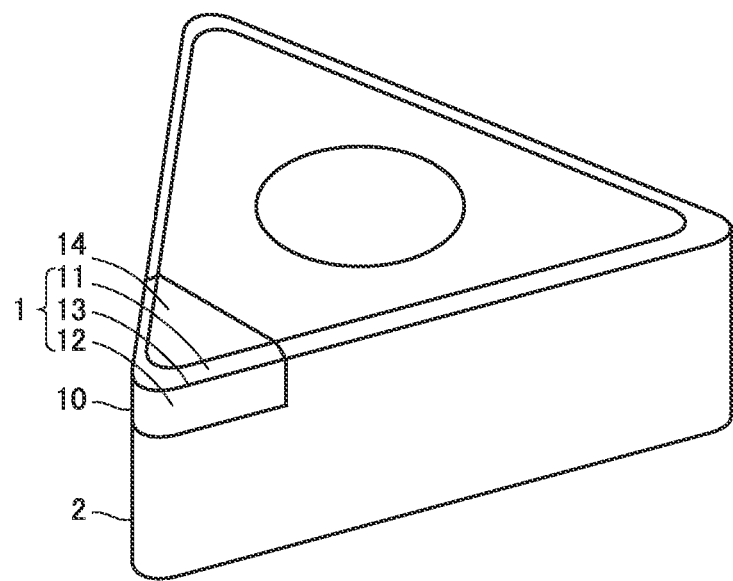
FIG. 1 is a perspective view illustrating a cutting tool according to a first embodiment.

Problem to be Solved by the Present Disclosure

In the cutting tool described in PTD 1, the round honed face is formed by polishing the face with a grindstone or by electric discharge machining. When using these processing methods, it is difficult to form a round honed face having a radius of curvature of 10 μm or less. Therefore, there is a room left for improving the sharpness of the cutting tool described in PTD 1.

The present disclosure has been made in view of the problems in the prior art. Specifically, the present disclosure provides a cutting tool with improved sharpness.

Advantageous Effect of the Present Disclosure

According to the cutting tool of an aspect of the present disclosure, it is possible to improve the sharpness of the cutting tool.

Description of Embodiments

First, aspects of the present disclosure will be described hereinafter.

(1) A cutting tool according to an aspect of the present disclosure includes a cutting edge portion which contains at least one of cubic boron nitride and polycrystalline diamond. The cutting edge portion includes a rake face, a flank face, and a cutting edge. The flank face is contiguous to the rake face. The cutting edge is provided as a ridgeline between the rake face and the flank face. The radius of curvature of the cutting edge is 2 μm or more and 8 μm or less. According to the cutting tool described in the above (1), it is possible to improve the sharpness of the cutting tool.

(2) A cutting tool according to another aspect of the present disclosure includes a cutting edge portion which contains at least one of cubic boron nitride and polycrystalline diamond. The cutting edge portion includes a negative land, a flank face, and a cutting edge. The flank face is contiguous to the negative land. The cutting edge is provided as a ridgeline between the negative land and the flank face. The radius of curvature of the cutting edge is 2 μm or more and 8 μm or less. According to the cutting tool described in the above (2), it is possible to improve the sharpness of the cutting tool.

(3) In the cutting tool described in the above (1) or (2), the radius of curvature may vary along the extending direction of the cutting edge.

According to the cutting tool described in the above (3), it is possible to cope with the case where different performance is required for different part of the cutting edge.

(4) In the cutting tool described in the above (1) or (2), the arithmetic average roughness of the surface of the cutting edge may be 0.05 μm or more and 2 μm or less. According to the cutting tool described in the above (4), the adhesion of the work material to the cutting edge can be suppressed.

(5) In the cutting tool described in the above (4), the arithmetic average roughness may vary along the extending direction of the cutting edge.

According to the cutting tool described in the above (5), it is possible to cope with the case where different performance is required for different part of the cutting edge.

(6) The cutting tool described in the above (1) or (2) may be an end mill. In the cutting tool described in the above (1) or (2), the cutting edge may extend along a direction from a tip end of the cutting tool toward a shank thereof, and the radius of curvature may decrease along the direction from the tip end toward the shank.

According to the cutting tool described in the above (6), it is possible to suppress the initial fracture of the cutting tool, preventing burrs from occurring in the workpiece.

(7) According to an aspect of the present disclosure, there is provided a method for manufacturing a cutting tool including a cutting edge portion which contains at least one of cubic boron nitride and polycrystalline diamond. The cutting edge portion includes a rake face, a flank face contiguous to the rake face, and a cutting edge provided as a ridgeline between the rake face and the flank face. The method includes a step of forming the cutting edge having a radius of curvature of 2 µm or more and 8 µm or less by irradiating the ridgeline with laser.

According to the method for manufacturing the cutting tool described in the above (7), it is possible to obtain a cutting tool with improved sharpness.

(8) The method for manufacturing the cutting tool described in the above (7) may further includes a step of forming the rake face and the flank face by irradiating the cutting tool with laser.

According to the method for manufacturing a cutting tool described in the above (8), there is no need to perform the positioning again at the time of forming the cutting edge, the cutting edge can be formed with high accuracy.

(9) According to another aspect of the present disclosure, there is provided a method for manufacturing a cutting tool including a cutting edge portion which contains at least one of cubic boron nitride and polycrystalline diamond. The cutting edge portion includes a negative land, a flank face contiguous to the negative land, and a cutting edge provided as a ridgeline between the negative land and the flank face. The method includes a step of forming the cutting edge having a radius of curvature of 2 µm or more and 8 µm or less by irradiating the ridgeline with laser.

According to the method for manufacturing a cutting tool described in the above (9), it is possible to obtain a cutting tool with improved sharpness.

(10) The method for manufacturing a cutting tool described in the above (9) may further include a step of forming the negative land and the flank by irradiating the cutting tool with laser.

According to the manufacturing method of the cutting tool described in the above (10), there is no need to perform the positioning again at the time of forming the cutting edge, the cutting edge can be formed with high accuracy.

DETAILS OF EMBODIMENTS OF THE PRESENT DISCLOSURE

Hereinafter, embodiments of the present disclosure will be described in detail with reference to the drawings. It should be noted that in the drawings, the same or corresponding parts are denoted by the same reference numerals. In addition, at least some of the embodiments described below may be arbitrarily combined.

First Embodiment

Hereinafter, the configuration of the cutting tool according to a first embodiment will be described.

FIG. 1 is a perspective view illustrating a cutting tool according to the first embodiment. As illustrated in FIG. 1, the cutting tool according to the first embodiment is, for example, a cutting insert. However, the cutting tool according to the first embodiment is not limited to the cutting insert.

The cutting tool according to the first embodiment has a cutting edge portion 1. The cutting edge portion 1 includes a negative land 11, a flank face 12, and a cutting edge 13. The negative land 11 forms a negative angle with respect to a rake face 14. The expression that the negative land 11 forms a negative angle with respect to the rake face 14 means that in a state where the rake face 14 faces upward and the cutting edge 13 faces leftward, the negative land 11 rotates counterclockwise with respect to the rake face 14. As illustrated in FIG. The flank face 12 is contiguous to the negative land 11. The cutting edge 13 is provided as a ridgeline between the negative land 11 and the flank face 12.

Figure 2:
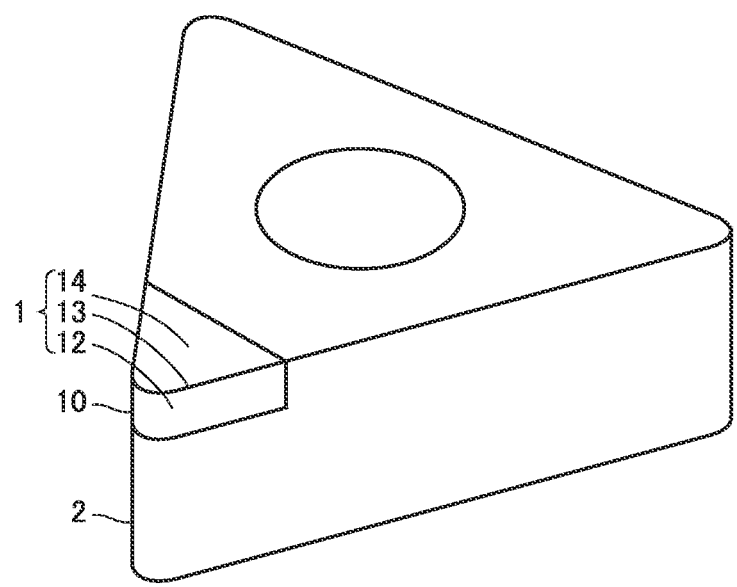
FIG. 2 is a perspective view illustrating a cutting tool according to a modified example of the first embodiment.

FIG. 2 is a perspective view illustrating a cutting tool according to a modified example of the first embodiment. As illustrated in FIG. 2, the cutting edge portion 1 may include a rake face 14, a flank face 12, and a cutting edge 13. In other words, the cutting edge portion 1 may not include the negative land 11. In the modified example, the flank face 12 is contiguous to the rake face 14, and the cutting edge 13 is provided as a ridgeline between the rake face 14 and the flank face 12.

The cutting edge portion 1 is a part of the cutting edge chip 10 made of a sintered material containing at least one of cubic boron nitride (CBN) and polycrystalline diamond (PCD), for example. In the present disclosure, "a sintered material containing at least one of CBN and PCD" includes a sintered material containing CBN but not containing PCD, a sintered material containing PCD but not containing CBN, and a sintered material containing both of CBN and PCD. The cutting edge portion 1 may be a part of a cutting tool made of a sintered material containing at least one of CBN and PCD. Further, the cutting edge portion 1 may be a part of a cutting tool made of a base material such as cemented carbide and at least one of CBN and PCD coated on the surface of the base material. In summary, the cutting edge portion 1 may only need to contain one of CBN and PCD on at least its surface. If the cutting edge portion 1 is a part of the cutting edge chip 10 made of a sintered material containing at least one of CBN and PCD, the cutting edge chip 10 is attached to a base metal 2 made of cemented carbide or the like via brazing, for example.

If the cutting edge portion 1 is a sintered material containing CBN but not containing PCD, the volume ratio of CBN contained in the cutting edge portion 1 is preferably 20 volume % or more. If the cutting edge portion 1 is a sintered material containing PCD but not containing CBN, the volume ratio of PCD contained in cutting edge portion 1 is preferably 20 volume % or more. If the cutting edge portion 1 is a sintered material containing both CBN and PCD, the total volume ratio of CBN and PCD contained in cutting edge portion 1 is preferably 20 volume % or more. Accordingly, it is possible to set the cutting depth of the cutting tool to an appropriate range for finishing use.

Figure 3:
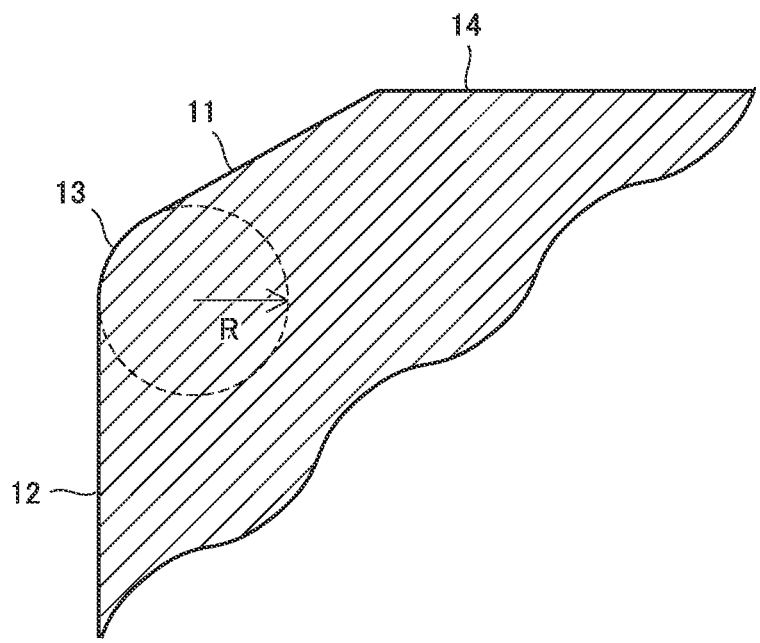
FIG. 3 is a cross-sectional view perpendicular to a cutting edge in the vicinity of a cutting edge portion of the cutting tool according to the first embodiment.
Figure 4:
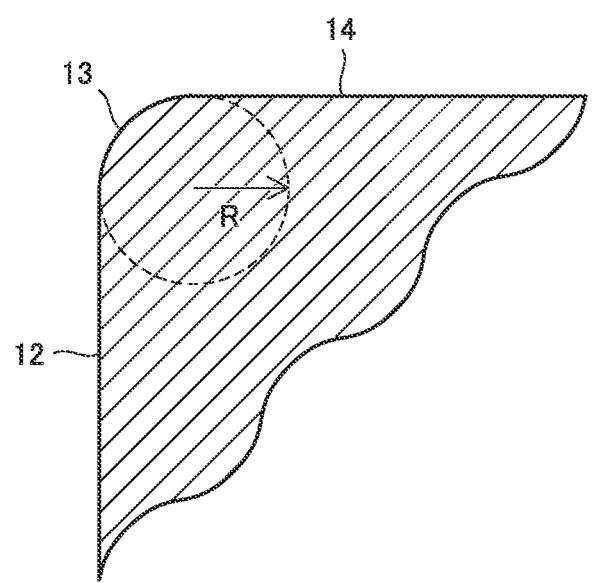
FIG. 4 is a cross sectional view perpendicular to a cutting edge in the vicinity of a cutting edge portion of a cutting tool according to a modified example of the first embodiment.

FIG. 3 is a cross-sectional view perpendicular to the cutting edge in the vicinity of the cutting edge portion of the cutting tool according to the first embodiment. FIG. 4 is a cross-sectional view perpendicular to the cutting edge in the vicinity of the cutting edge portion of the cutting tool according to a modified example of the first embodiment. As illustrated in FIGS. 3 and 4, the cutting edge 13 has a radius of curvature R. The radius of curvature R is 2 µm or more and 8 µm or less. The arithmetic average roughness Ra of the surface of the cutting edge 13 is preferably 0.05 µm or more and 2 µm or less. The arithmetic average roughness of the surface of the cutting edge 13 is measured by using a laser displacement meter.

The radius of curvature R of the cutting edge 13 may not be uniform in the extending direction of the cutting edge 13. In other words, the radius of curvature R of the cutting edge 13 may vary along the extending direction of the cutting edge 13. The arithmetic average roughness Ra of the surface of the cutting edge 13 may not be uniform in the extending direction of the cutting edge 13. In other words, the arithmetic average roughness Ra of the surface of the cutting edge 13 may vary along the extending direction of the cutting edge 13.

Hereinafter, a method for manufacturing a cutting tool according to the first embodiment will be described. The method for manufacturing a cutting tool according to the first embodiment includes a laser irradiating step S1.

Figure 5:
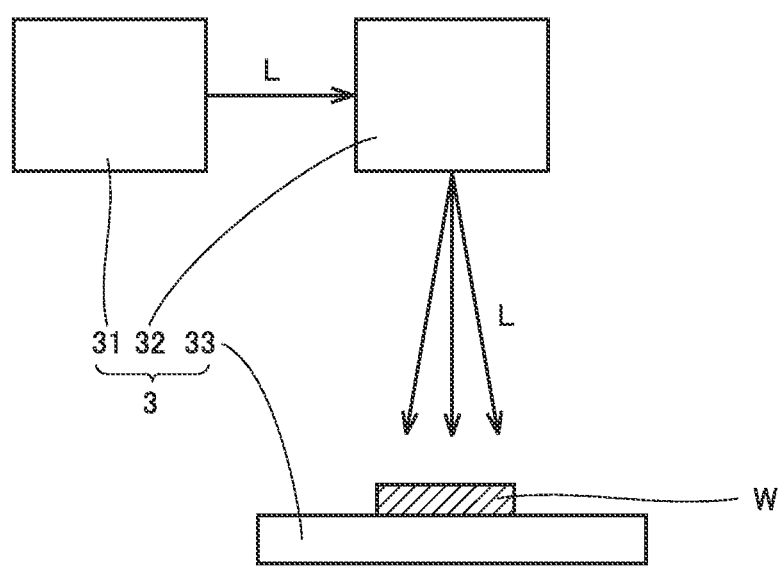
FIG. 5 is a schematic view illustrating a machining apparatus used in the method for manufacturing the cutting tool according to the first embodiment.

FIG. 5 is a schematic diagram illustrating a machining apparatus used in the method for manufacturing the cutting tool according to the first embodiment. As illustrated in FIG. 5, the machining apparatus 3 includes a light source 31, a scanner head 32, and a machining stage 33. The light source 31 supplies laser L to the scanner head 32. A workpiece W is placed on the machining stage 33. The scanner head 32 scans the surface of the workpiece W with laser L supplied from the light source 31. The scanner head 32 is, for example, a galvanometer scanner. The laser irradiating step S1 is performed by using the machining apparatus 3.

The workpiece W has a negative land 11 and a flank face 12. The laser irradiating step S1 is performed by irradiating the workpiece W placed on the machining stage 33 with laser L. More specifically, laser L is irradiated to the ridgeline between the negative land 11 and the flank face 12. As a result, a part of the workpiece W at the ridgeline between the negative land 11 and the flank face 12 is removed, so that the cutting edge 13 is formed. If the workpiece W does not have the negative land 11 but has the rake face 14 and the flank face 12, the cutting edge 13 is formed by irradiating the ridgeline between the rake face 14 and the flank face 12 with laser L.

It should be noted that the negative land 11 (or the rake face 14) and the flank face 12 may also be formed by the irradiation of laser L. In this case, the workpiece W may be kept without moving relative to the machining stage 33 in not only the step of forming the negative land 11 (or the rake face 14) and the flank face 12 and but also the step of forming the cutting edge 13. Thus, there is no need to perform the positioning of the workpiece when transferring it from the step of forming the negative land 11 (or the rake face 14) and the flank face 12 to the step of forming the cutting edge 13, which makes it possible to form the cutting edge 13 with high accuracy.

Effects of the cutting tool and the manufacturing method thereof according to the first embodiment will be described below.

The smaller the radius of curvature R of the cutting edge 13 is, the sharper the shape of the cutting edge will be, which makes it possible to improve the sharpness of the cutting tool. As described in the above, in the cutting tool according to the first embodiment, the radius of curvature R of the cutting edge 13 is 2 μm or more and 8 μm or less. The radius of curvature R is smaller than the radius of curvature which could be realized in a conventional cutting tool. Therefore, according to the cutting tool of the first embodiment, it is possible to improve the sharpness of the cutting tool.

On the other hand, if the radius of curvature R of the cutting edge 13 is too small, it is likely to decrease the fracture resistance of the cutting edge 13. Depending on applications of the cutting tool, a part of the cutting edge 13 may be required to have greater sharpness, while the other parts of the cutting edge may be required to have greater fracture resistant. In the cutting tool according to the first embodiment, the radius of curvature R of the cutting edge 13 is configured to vary along the extending direction of the cutting edge 13, which makes it possible to cope with the case where different performance is required for different parts of the cutting edge 13.

If the round honing of the cutting edge is carried out by polishing it with a grindstone or by electric discharge machining, it is difficult to realize an uniformly low arithmetic average roughness Ra of the surface of the cutting edge. if the arithmetic average roughness Ra of the surface of the cutting edge is large, the workpiece is likely to adhere to the cutting edge.

As described in the above, in the cutting tool according to the first embodiment, since the arithmetic average roughness Ra of the surface of the cutting edge 13 may be processed to 0.05 μm or more and 2 μm or less, it is possible to suppress the adhesion of the workpiece to the cutting edge 13.

As the arithmetic average roughness Ra of the surface of the cutting edge 13 increases, the contact area between the workpiece and the cutting edge 13 decreases, and as a result, the friction between the cutting edge 13 and the workpiece tends to decrease. Depending on applications of the cutting tool, a part of the cutting edge 13 may be required to prevent the adhesion to the workpiece, while the other parts of the cutting edge 13 may be required to reduce the friction with the workpiece.

In the cutting tool according to the first embodiment, the arithmetic average roughness Ra of the surface of the cutting edge 13 is configured to vary along the extending direction, which makes it possible to cope with the case where different performance is required for different parts of the cutting edge 13.

In the method for manufacturing the cutting tool according to the first embodiment, the cutting edge 13 is formed by irradiation of laser L. When machining the cutting edge 13 with laser L, it is possible to control the machining more precisely compared with the case of polishing the cutting edge 13 with a grindstone or by electric discharge machining. Therefore, according to the method for manufacturing a cutting tool according to the first embodiment, the radius of curvature R of the cutting edge 13 may be processed to 2 μm or more and 8 μm or less, and the arithmetic average roughness Ra of the surface of the cutting edge 13 may be processed to 0.05 μm or more and 2 μm or less.

When machining the cutting edge 13 with laser L, it is possible to control the machining range more precisely compared with the case of polishing the cutting edge 13 with a grindstone or by electric discharge machining. Therefore, according to the method for manufacturing a cutting tool according to the first embodiment, the radius of curvature R of the cutting edge 13 and the arithmetic average roughness Ra of the surface of the cutting edge 13 may be processed to vary along the extending direction of the cutting edge 13.

Second Embodiment

Hereinafter, the cutting tool according to a second embodiment will be described. In the following, the description will be carried out mainly on the points different from the cutting tool according to the first embodiment, and the duplicate contents will not be repeated.

The cutting tool according to the second embodiment includes a cutting edge portion 1. The cutting edge portion 1 contains at least one of CBN and PCD. The cutting edge portion 1 includes a negative land 11, a flank face 12, and a cutting edge 13. The cutting edge portion 1 may include a rake face 14, a flank face 12, and a cutting edge 13. The radius of curvature R of the cutting edge 13 is 2 μm or more and 8 μm or less. The arithmetic average roughness Ra of the surface of the cutting edge 13 is 0.05 μm or more and 2 μm or less. The radius of curvature R of the cutting edge 13 and the arithmetic average roughness Ra of the surface of the cutting edge 13 vary along the extending direction of the cutting edge 13. In these respects, the cutting tool according to the second embodiment is the same as the cutting tool according to the first embodiment.

Figure 6:
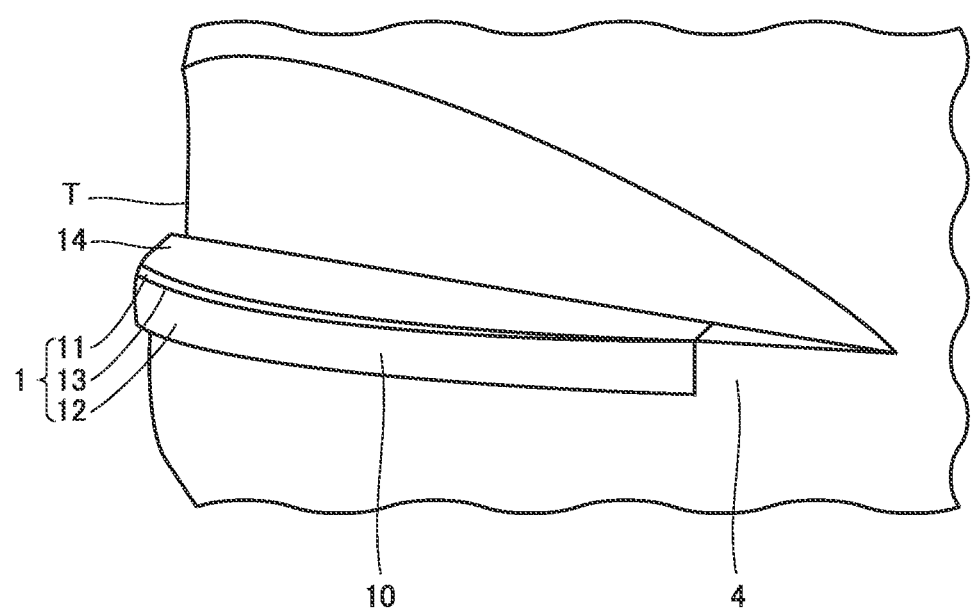
FIG. 6 is a partially enlarged perspective view illustrating a cutting tool according to a second embodiment.

FIG. 6 is a partially enlarged perspective view illustrating the cutting tool according to the second embodiment. As illustrated in FIG. 6, the cutting tool according to the second embodiment is an end mill. The cutting tool according to the second embodiment includes, for example, a cutting edge chip 10 having a cutting edge portion 1, and a body 4 to which the cutting edge chip 10 is attached. The cutting edge chip 10 is attached to the outer peripheral surface of the body 4. The body 4 is made of, for example, cemented carbide.

The cutting tool according to the second embodiment has a tip end T. Although not shown, the cutting tool according to the second embodiment has a shank located opposite to the tip end T. The cutting tool according to the second embodiment is attached to a spindle of a machining tool via the shank. In the cutting tool according to the second embodiment, the cutting edge 13 extends along a direction from the tip end T to the shank. The radius of curvature R of the cutting edge 13 decreases along a direction from the tip end T to the shank. In these respects, the cutting tool according to the second embodiment is different from the cutting tool according to the first embodiment.

When cutting is performed by using the cutting tool according to the second embodiment, the cutting edge 13 closer to the tip end T will firstly bite into the workpiece. In this case, if the fracture resistance of the cutting edge 13 is low, the initial fracture is likely to occur in the cutting edge 13 closer to the tip end T. In addition, when the cutting edge 13 closer to the shank is bad in sharpness, burrs are likely to occur on the workpiece.

As described in the above, in the cutting tool according to the second embodiment, the radius of curvature R of the cutting edge 13 is configured to decrease along a direction from the tip end T to the shank. In other words, in the cutting tool according to the second embodiment, the cutting edge 13 closer to the tip end T is configured to have high fracture resistance while the cutting edge 13 closer to the shank is configured to have high sharpness. Therefore, according to the cutting tool of the second embodiment, it is possible to suppress the occurrence of burrs in the workpiece while suppressing the initial fracture of the cutting tool.

It should be understood that the embodiments disclosed herein have been presented for the purpose of illustration and description but not limited in all aspects. It is intended that the scope of the present disclosure is not limited to the description above but defined by the scope of the claims and encompasses all modifications equivalent in meaning and scope to the claims.

REFERENCE SIGNS LIST

1: cutting edge portion; 10: cutting edge chip; 11: negative land; 12: flank face; 13: cutting edge; 14: rake face; 2: base metal; 3: machining apparatus; 31: light source; 32: scanner head; 33: machining stage; 4: body; L: laser; R: radius of curvature; Ra: arithmetic average roughness; S1: laser irradiating step; T: tip end; W: workpiece.

The invention claimed is:

1. A cutting tool comprising a cutting edge portion which contains at least one of cubic boron nitride and polycrystalline diamond,
    the cutting edge portion including a rake face, a flank face contiguous to the rake face, and a cutting edge provided as a ridgeline between the rake face and the flank face,
    a radius of curvature of the cutting edge being 2 μm or more and 8 μm or less,
    wherein the rake face and flank face are contiguous to each other in a first direction, and the radius of curvature varies along a second direction intersecting the first direction.

2. The cutting tool according to claim 1, wherein the arithmetic average roughness of the surface of the cutting edge is 0.05 μm or more and 2 μm or less.

3. The cutting tool according to claim 2, wherein the arithmetic average roughness varies along the extending direction of the cutting edge.

4. The cutting tool according to claim 1, wherein
    the cutting tool is an end mill,
    the cutting edge extends along a direction from a tip end of the cutting tool toward a shank thereof,
    the radius of curvature decreases along the direction from the tip end toward the shank.

5. A cutting tool comprising a cutting edge portion which contains at least one of cubic boron nitride and polycrystalline diamond,
    the cutting edge portion including a negative land, a flank face contiguous to the negative land, and a cutting edge provided as a ridgeline between the negative land and the flank face,
    a radius of curvature of the cutting edge being 2 μm or more and 8 μm or less,
    wherein the rake face and flank face are contiguous to each other in a first direction, and the radius of curvature varies along a second direction intersecting the first direction.

6. The cutting tool according to claim 5, wherein the arithmetic average roughness of the surface of the cutting edge is 0.05 μm or more and 2 μm or less.

7. The cutting tool according to claim 6, wherein the arithmetic average roughness varies along the extending direction of the cutting edge.

8. The cutting tool according to claim 5, wherein
    the cutting tool is an end mill,
    the cutting edge extends along a direction from a tip end of the cutting tool toward a shank thereof,
    the radius of curvature decreases along the direction from the tip end toward the shank.

* * * * *